Aug. 11, 1953 — I. E. WRIGHT — 2,648,436
FLOUR SIFTER
Filed Aug. 21, 1950
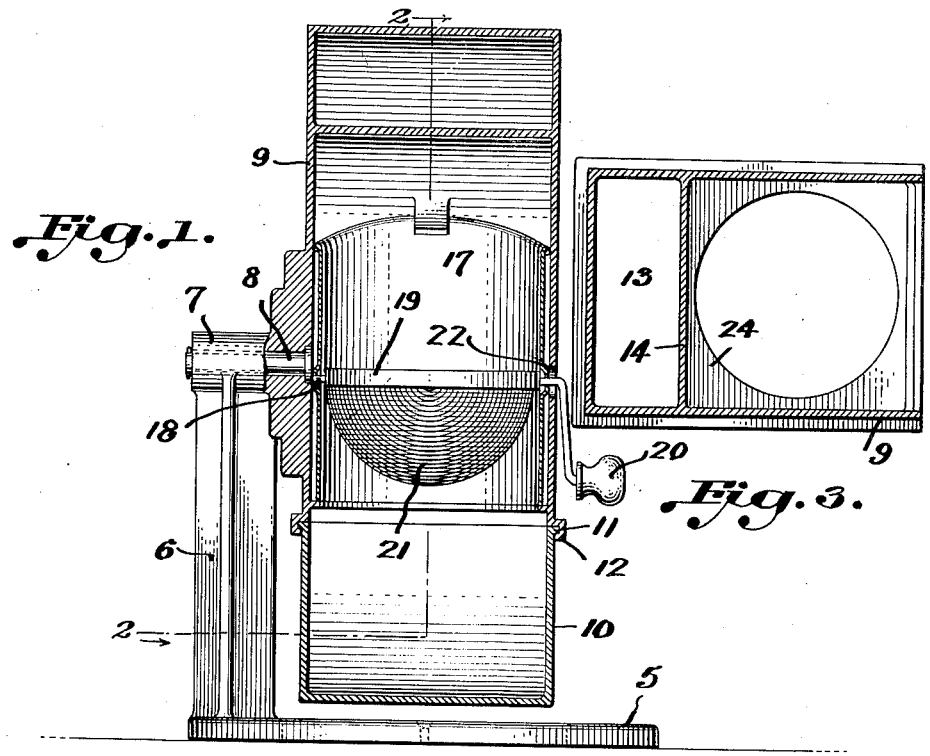
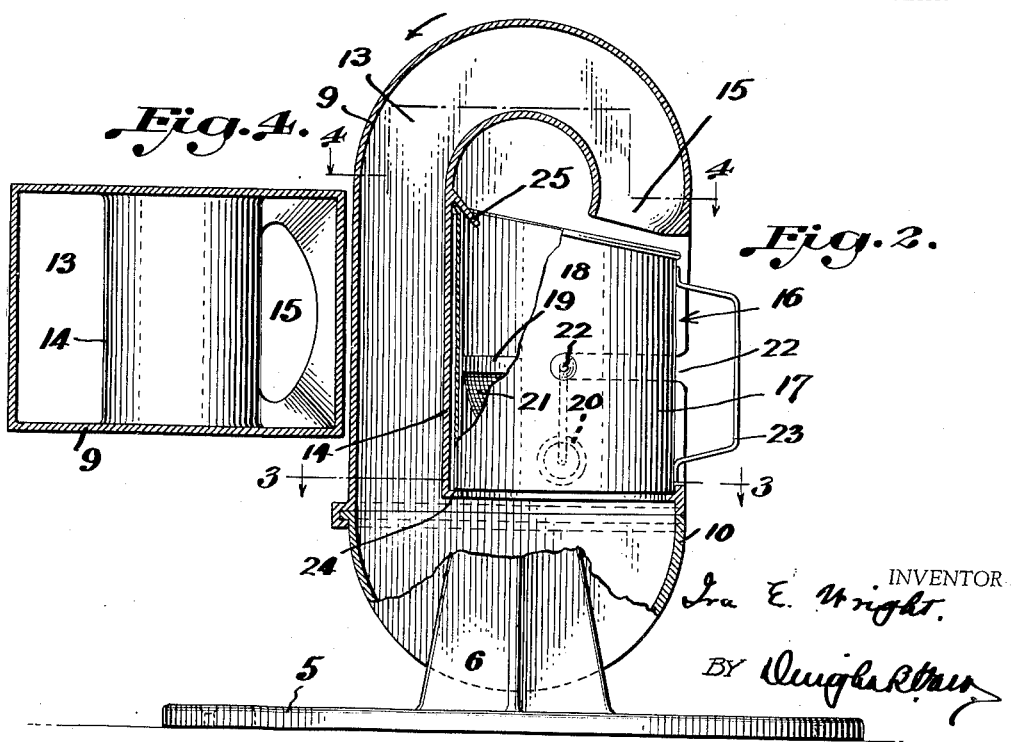
INVENTOR
Ira E. Wright
BY
ATTORNEY Patented Aug. 11, 1953

2,648,436

UNITED STATES PATENT OFFICE 2,648,436

FLOUR SIFTER

Ira Everette Wright, Elizabeth City, N. C., assignor of one-half to C. Lydon Harrell, Jr., and Martha G. Harrell, Norfolk, Va.

Application August 21, 1950, Serial No. 180,645

4 Claims. (Cl. 209—240)

This invention is a flour sifter, having for its primary object to provide means of simplified nature whereby a series of flour siftings may be carried out with a minimum of time and labor and without the necessity of the interchange of flour heretofore required in domestic flour sifting operations.

A further object of the invention is to provide improved flour sifting means embodying a housing or body built and constructed so as to accommodate the common or well known domestic flour sifter in its operations.

A further and particular object of the invention is to provide a machine within which may be inserted the ordinary domestic flour sifter, and wherein with a minimum of effort and a short space of time the flour contained in the sifter may be passed through the sifting surface the desired number of times, thus to insure fineness in the flour sifted.

With these objects in view, together with others which will appear as the description proceeds, the invention consists in the novel construction, combination and arrangement of parts, all as will be described more fully hereinafter, illustrated in the drawings, and particularly pointed out in the claims.

In the drawings—

Fig. 1 is a vertical longitudinal sectional view taken through a flour sifter constructed in accordance with my invention, Fig. 2 is a similar sectional view taken substantially upon line 2—2 of Fig. 1, Fig. 3 is a transverse horizontal sectional view taken upon line 3—3 of Fig. 2, and Fig. 4 is a similar sectional view taken upon line 4—4 of Fig. 2.

The invention resides in the provision of a hollow revoluble housing having therein a channel or passage through which the flour to be sifted passes as the housing is rotated. This channel communicates with a passage or recess within which the ordinary domestic flour sifter may be inserted, so that the sifter travels in the rotary motion applied to the revoluble body and brings about a complete flour sifting operation with each revolution of the body.

More particularly, the supporting base for the device is indicated at 5, from one side of which rises a standard or support 6. The base 5 will be of sufficient breadth and length as to adequately support the structure mounted upon the standard 6. This standard is provided at its upper end with a bearing 7 to receive a shaft 8 rigidly secured to and projecting outwardly from one side of a body or housing 9. This housing, as shown particularly in Fig. 2 of the drawing, is of substantially oval configuration, and the shaft 8 is so located on the side of this housing that the latter will be supported in substantially balanced relationship by the bearing 7.

The housing 9 includes at its lower end a removable drawer 10, the latter being provided at its upper edges with lateral and outwardly projecting flanges 11 to slidably engage within the tracks represented at 12 at the sides of the housing.

The remainder of the housing upon the interior thereof is provided with a channel 13 substantially coterminous with the housing. To this end, a wall 14 is arranged within the housing in spaced relationship to the outer wall thereof and taking substantially the same course as the said outer wall. The channel 13 has an opening 15 communicating with the interior of the housing in spaced relationship from the slidable drawer 10. This termination of the channel at the throat 15 provides an opening indicated at 16 in one side of the housing 9 and in which may be inserted the body 17 of the ordinary household sifter. As will be understood, this sifter will be equipped with a rotatable shaft 18 supporting the sifter blade 19, the handle 20 being provided to enable the user to easily bring about a rotary movement of the blade against the sifter screen 21 affixed within the body of the sifter as shown. In order that the sifter body may be readily accommodated within the opening 16, a side wall of the body 9 will be recessed at 22 a distance inwardly of the body sufficiently to permit the shaft 18 of the sifter to enter. The usual handle 23 is affixed to the body of the sifter to facilitate its application to and removal from the rotatable body.

Arranged within the body 9 and immediately above the top of drawer 10 is a supporting flange 24. This flange projects into the lower part of passage 16 a distance sufficient to constitute a support for the bottom of the sifter 17 when the latter is accommodated within the housing. The wall 14 is provided with an overhanging lip 25 near the upper end of the said wall to engage over the upper edge of the sifter body 17 when the said body is inserted within the rotatable body.

In operation, the desired amount of flour is applied to the sifter 17 and the latter is then inserted within the rotatable body as shown in Fig. 2. The handle 20 is grasped and rotated until the flour within the body of the sifter has been screened and deposited in the removable drawer 10. The sifter 17 may then be removed and inverted so as to remove therefrom such material or matter as remains unsifted, whereupon the sifter body 17 is then returned to the chamber. The operator then gives the body 9 a complete rotation in the direction of the arrow shown in Fig. 2, whereupon the flour collected in the drawer 10 will pass into the channel 13 following its course therein to the throat 15 in one complete revolution of the body. It will thus be seen that the entire contents of the drawer 10 will be delivered to the upper end of the sifter body 17 through the throat 15. The operator then rotates the sifter knob 20 to bring about a further sifting of the flour and the operations above described are repeated. Sifting in this manner may be carried out until the material reaches that degree of fineness and fluffiness required by the operator, whereupon the drawer 10 is removed from the housing and the finely divided contents thereof may be put to use in the desired manner.

By the use of a flour sifting device of the character described, it is apparent that the processes heretofore employed in domestic flour sifting operations are dispensed with, as the entire operation may be carried out in a series of simple and easy operations and without the necessity of the constant pouring back and forth as has heretofore been the practice. Moreover, by subjecting the flour to sifting operations as here described, little jostling of the flour is imposed and the compression of the flour by the methods heretofore practiced will be entirely obviated.

I claim:

1. In a sifter, a support, a body rotatably mounted on said support, said body having an opening in one side thereof through which a sifter may be introduced to said body, said body having a channel therein communicating at one end with the bottom of said opening and at its other end with the top of said opening, and supporting means in said body for said sifter.

2. In a sifting machine, a support, a body of substantially oval shape rotatably mounted on said support, said body having an opening in one side thereof and within which a sifter may be inserted, said body having a channel therein communicating at one end with the lower end of said sifter and at its opposite end with the top of said sifter, and means in the body to support said sifter.

3. In a sifting machine, a support, a body of substantially oval shape rotatably mounted intermediate its ends on said support, one side of said body having an opening therein to receive a flour sifter, a drawer removably secured in the bottom of said body and immediately below and in communication with the lower end of said sifter, and said body having a channel therein coterminous with the body and communicating at one end with said drawer and at its upper end with the corresponding end of said flour sifter.

4. In a sifting machine, a support, a body of substantially oval shape rotatably supported intermediate its ends on said support, said body having an opening in one side thereof through which a flour sifter may be inserted, means in said body to secure said sifter in position, said body having a channel therein with one end communicating with the bottom of said sifter and the other end communicating with the top thereof, and a removable drawer in the bottom of said body.

IRA EVERETTE WRIGHT.

References Cited in the file of this patent

UNITED STATES PATENTS

| Number | Name | Date |
|---|---|---|
| 911,130 | Jones | Feb. 2, 1909 |
| 1,349,492 | Campbell | Aug. 10, 1920 |
| 1,461,567 | Wheeler | July 10, 1923 |

FOREIGN PATENTS

| Number | Country | Date |
|---|---|---|
| 8,832 | Germany | Feb. 4, 1880 |
| 563,266 | France | Sept. 22, 1923 |